United States Patent
Piva et al.

(10) Patent No.: US 6,871,785 B2
(45) Date of Patent: Mar. 29, 2005

(54) METHOD AND DEVICE FOR COMPENSATING UNDESIRED VARIATIONS IN AN ELECTRICAL SIGNAL GENERATED BY AN OPTICAL CODE READER

(75) Inventors: Marco Piva, Bologna (IT); Maurizio Bianchi, Bologna (IT)

(73) Assignee: Datalogic S.p.A (IT)

( * ) Notice: Subject to any disclaimer, the term of this patent is extended or adjusted under 35 U.S.C. 154(b) by 311 days.

(21) Appl. No.: 09/740,155

(22) Filed: Dec. 19, 2000

(65) Prior Publication Data

US 2001/0006190 A1 Jul. 5, 2001

(30) Foreign Application Priority Data

Dec. 24, 1999 (EP) .............................................. 99830798

(51) Int. Cl.[7] ................................................ G06K 7/10
(52) U.S. Cl. ............. 235/454; 235/462.23; 235/462.25; 235/462.26; 235/462.27; 235/462.28; 235/462.29; 340/870.18; 340/870.19; 340/870.21; 340/514; 340/511; 340/455.04
(58) Field of Search ........................... 235/454, 462.23, 235/462.25, 462.26, 462.27, 462.28, 462.29; 340/870.18, 870.19, 870.21, 514, 511, 455.04, 455.03

(56) References Cited

U.S. PATENT DOCUMENTS

| | | | |
|---|---|---|---|
| 3,794,919 A | * 2/1974 | Villeret et al. ............... 375/251 |
| 3,815,124 A | * 6/1974 | Brewer ......................... 341/160 |
| 3,832,577 A | 8/1974 | Harr ............................. 307/235 |
| 3,986,000 A | * 10/1976 | McJohnson ............ 235/462.27 |
| 4,356,389 A | * 10/1982 | Quirey et al. ................ 235/455 |
| 5,028,771 A | 7/1991 | Yang ........................... 235/426 |
| 5,272,323 A | * 12/1993 | Martino .................. 235/462.27 |
| 5,298,728 A | 3/1994 | Elliott et al. ................. 235/463 |
| 5,432,862 A | * 7/1995 | Hirsch ......................... 382/207 |
| 5,506,411 A | * 4/1996 | Tasaki ......................... 250/568 |
| 5,714,478 A | * 2/1998 | Spiegel ......................... 514/77 |
| 6,031,481 A | * 2/2000 | Craven ......................... 341/200 |
| 6,036,091 A | * 3/2000 | Spitz ...................... 235/462.25 |

* cited by examiner

*Primary Examiner*—Michael G. Lee
*Assistant Examiner*—Seung H Lee
(74) *Attorney, Agent, or Firm*—Lerner, David, Littenberg, Krumholz & Mentlik, LLP

(57) ABSTRACT

The method for compensating undesired variations in an electrical signal generated by a sensor of an optical code reader comprises the steps of generating an envelope signal starting from the electrical signal generated by the sensor and normalizing the electrical signal with respect to the envelope signal. Preferably, the envelope signal is filtered with a low-pass filter before being normalized so as to eliminate steps and edges which may cause distortions during normalization, and the normalized signal is amplified in a controlled way so as to supply an output signal ranging between two values having preset amplitudes. Normalization is carried out by dividing, point by point, the electrical signal by the envelope signal, in the case of continuous analog processing; alternatively, in presence of discrete-time signals, normalization is carried out by subtracting the envelope signal from the electrical signal.

21 Claims, 8 Drawing Sheets

METHOD AND DEVICE FOR COMPENSATING UNDESIRED VARIATIONS IN AN ELECTRICAL SIGNAL GENERATED BY AN OPTICAL CODE READER

The present invention regards a method and a device for compensating undesired variations in an electrical signal generated by an optical code reader.

BACKGROUND OF THE INVENTION

Optical code-reading systems are known and comprise: an illumination system which has the aim of generating and directing a light beam towards an optical code, for example a bar code; an optical group (generally comprising a lens system) which has the aim of collecting and focusing the light diffused by the optical code; a linear or two-dimensional sensor—for example, a CCD (charge-coupled device) sensor or a CMOS sensor—which has the aim of converting the optical signal into a continuous-time or discrete-time analog electrical signal; an interface which carries out analog pre-processing of the signal generated by the sensor so as to reduce the noise and generate a signal compatible with the downstream stages; an analog/digital converter which converts the analog signal received into binary form and transforms it into a succession of digital pulses; and a decoding system which processes the succession of digital pulses so as to extract the coded information from the optical code and output it in a form usable by processing electronic devices connected downstream or by display devices.

In reading systems there exists a high variability of the light signal detected by the sensitive surface of the sensor, in the absence of the optical code. This variability is due to the illumination conditions (the light generated by the illumination system is never constant over the entire illuminated surface, environmental light is variable, light reflections may be present, etc.), to the characteristics of the optical devices that receive the light, to the type of read code (in particular as regards contrast, i.e., the ratio between the code color and the background color, and the form of the code), to the sensor sensitivity characteristics (for example, characteristics due to the sensor dynamics which in certain cases may give rise to distortions), and to the reflectance of the surface on which the code is printed.

For example, in linear-type sensors, this variability in luminosity results in a variability of the electrical signal along the scanning line, a variability that affects the amplitude of the signal supplied to the interface, thus affecting decoding of the code. This may limit the reliability and operativeness of the reading system, for example in the case of poor or excessive illumination and in reading at a distance. Consequently, the above discussed luminosity variability, not depending on the code, represents a drawback that it is desirable to overcome.

In order to provide a partial solution to this drawback, at least as regards the variability due to the illumination system, it is possible to use complex illumination systems that are able to guarantee high illumination uniformity. Such a solution, however, involves a considerable increase in the cost of the optical code reader.

SUMMARY OF THE INVENTION

The aim of the present invention is therefore to provide a method and a device that are able to eliminate, or at least to reduce as much as possible, the variations in the electrical signal of the sensor that are not due to the code and that are hence undesirable, independently of the origin of such variations, at contained costs.

According to the present invention, a method is provided for compensating undesired variations in an electrical signal generated by a sensor of an optical code reader, characterized by the steps of generating an envelope signal starting from said electrical signal and normalizing said electrical signal with respect to said envelope signal to obtain a normalized signal.

Advantageously, the envelope signal is filtered with a low-pass filter before normalization. In addition, the normalized signal is amplified in a controlled way to supply an output signal that may range between a first preset amplitude value and a second preset amplitude value.

Normalization is carried out by dividing, point by point, the electrical signal by the envelope signal. Alternatively, in order to simplify the processing circuit, normalization may be carried out by subtracting the envelope signal from the electrical signal.

The invention further refers to a device for compensating undesired variations in an electrical signal generated by a sensor of an optical code reader, said device having an input terminal receiving said electrical signal, characterized by an envelope-generating stage receiving said electrical signal and generating an envelope signal, and a normalization stage normalizing said electrical signal according to said envelope signal and outputting a normalized signal.

In particular, the envelope-generating stage comprises a peak detector and is followed by a low-pass filter. The normalization stage comprises an analog divider or a subtracting element.

According to the present invention, an optical code reader is moreover provided which comprises a sensor having an output supplying an electrical signal representative of the luminosity detected by the sensor, characterized by a device compensating undesired variations of said electrical signal, said device being connected to said output of said sensor.

BRIEF DESCRIPTION OF THE DRAWINGS

Further characteristics of the invention will be clear from the description of preferred embodiments, illustrated purely as non-limiting examples, with reference to the attached drawings, wherein.

DETAILED DESCRIPTION OF THE INVENTION

Figure 1:
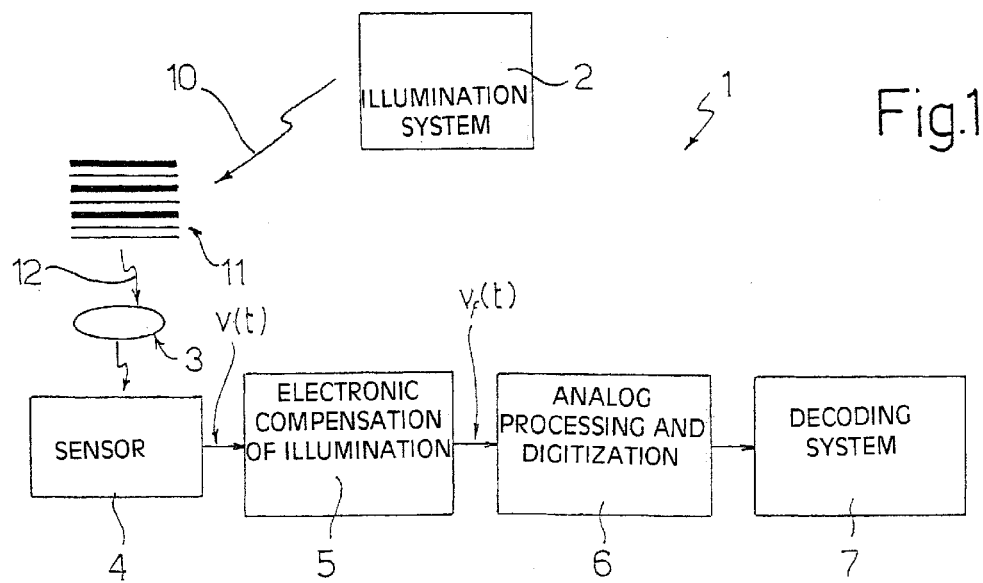
FIG. 1 is a block diagram of an optical reader incorporating a compensation device according to the present invention.

A general diagram of a reading system incorporating the present compensation device is shown in FIG. 1, wherein the reading system (designated as a whole by 1) comprises an illuminating system 2, an optical group 3, a sensor 4, an illumination compensating device 5, an analog processing and A/D converting block 6, and a decoding system 7. In the reading system 1, the illuminating system 2 generates a light beam 10 directed towards an optical code (in FIG. 1, a bar code 11); the light beam 10 illuminates the optical code and gives rise to a diffused radiation 12, which is collected and focused by the optical group 3 and converted into an electrical signal v(t) by the sensor 4. The sensor 4 can be of a linear type (for example, of CCD or CMOS type) and comprise a plurality of sensitive elements arranged linearly (in which case the light beam 10 can perform a plurality of scans along directions that are mutually parallel), or of two-dimensional type, in which case the electrical signal generated by the sensor corresponds to the entire optical code.

The illumination compensating device 5 has the function of normalizing the electrical signal v(t) so as to cause the peak amplitude of the electrical signal v(t) to be linear, and more in particular constant, so that the variations in the normalized signal, indicated in FIG. 1 by $v_f(t)$, represent, as far as possible, the optical code 10 alone.

To this end, the illumination compensating device 5 relates the electrical signal v(t) to its envelope. In particular, according to one first aspect of the invention, the electrical signal v(t) is divided, point by point, by its envelope, by calculating a local contrast function K(t) defined as $$K(t) = \frac{v(t) - V_{REF}}{v_{ENV} - V_{REF}}$$

wherein $V_{REF}$ is a reference value that may coincide with the minimum value of the signal in the absence of illumination.

Figure 2:
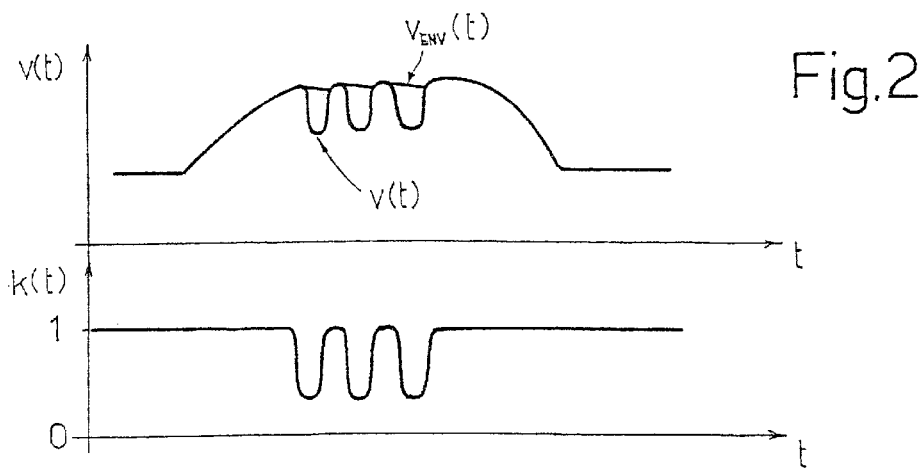
FIG. 2 shows the plots of electrical quantities for the compensation device of FIG. 1.

As shown in FIG. 2, the local contrast function K(t) calculated as indicated above is equal to 1 in the region of the background (wherein the signal v(t) coincides with the envelope), and ranges between a positive value and 1 in the region of the optical code. In particular, in the variable region, the local contrast signal K(t) reproduces the luminosity variations due to the alternation of bars and spaces forming the code. Consequently, at least to a first approximation, the local contrast signal K(t) is compensated with respect to the luminosity variations of the background and can be used for digitization and extraction of the optical information.

Indeed, the envelope signal $V_{ENV}$ represents the hypothetical signal obtained, in the same operating conditions, in the absence of the optical elements containing the coded information, i.e., the luminosity of the printing medium (background) alone. By calculating the ratio, point by point, between the envelope signal $V_{ENV}$ and the input signal v(t), a normalization operation is performed that enables the useful part of the signal (due to the optical code) to be highlighted. The normalization operation thus yields a value of the ratio K(t)=W=1 for all the "light" elements, and a value K(t)=B, with 0<B<1 for the dark elements of the code. The difference W−B can be considered as the measure of the contrast between the various elements, and being defined as a ratio, is independent of the absolute luminosity of the elements and hence of the illumination conditions and is optimal for the subsequent processing aimed at extracting the optical information.

Figure 3:
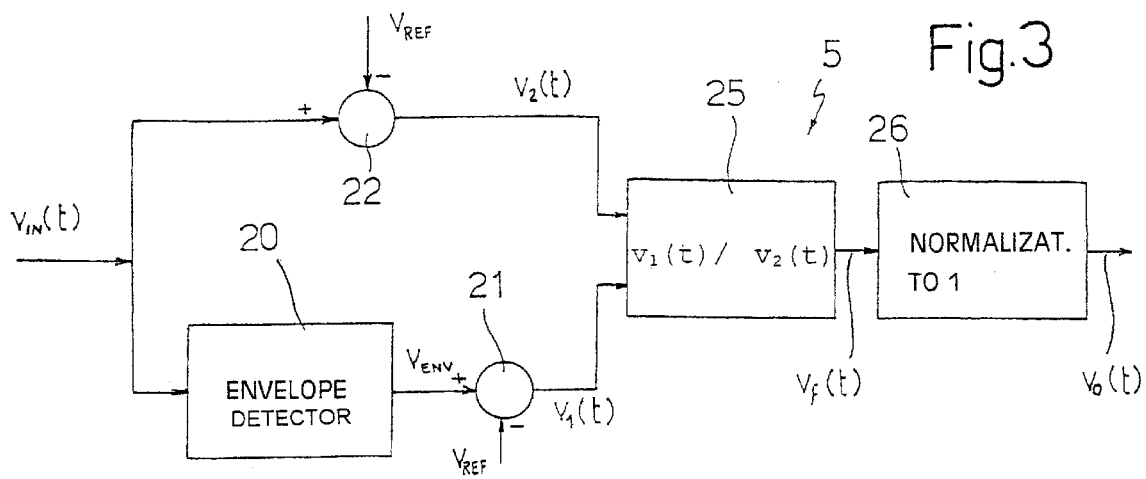
FIG. 3 is a block diagram of a first embodiment of the compensation device according to the invention.

FIG. 3 shows a block diagram of a first embodiment of the illumination compensating device 5 which operates according to the principles stated above and is particularly suited for a CCD-type sensor 4 (FIG. 1) issuing an input signal $v_{IN}(t)$.

The illumination compensating device 5 of FIG. 3 comprises an envelope detecting stage 20 receiving the input signal $v_{IN}(t)$ and outputting an envelope signal $v_{ENV}$; a first subtracting node 21 arranged downstream of the envelope-detecting stage 20 and intended to subtract, from the envelope signal $v_{ENV}$, a reference value $V_{REF}$ to obtain a first signal $v_1(t)$; a second subtracting node 22 intended to subtract, from the input signal $v_{IN}(t)$, the reference value $V_{REF}$ to obtain a second signal $v_2(t)$; a divider stage 25 receiving as input the first signal $v_1(t)$ and the second signal $v_2(t)$, and outputting a compensated signal $v_f(t)$ equal to $v_1(t)/v_2(t)$; a normalization-to-one stage 26, which amplifies the compensated signal $v_f(t)$ so that its portion corresponding to the optical code ranges between a first preset value, indicated by "0" (corresponding to a bar of the code), and a second preset value, indicated by "1" (corresponding to a space of the code).

Figure 4:
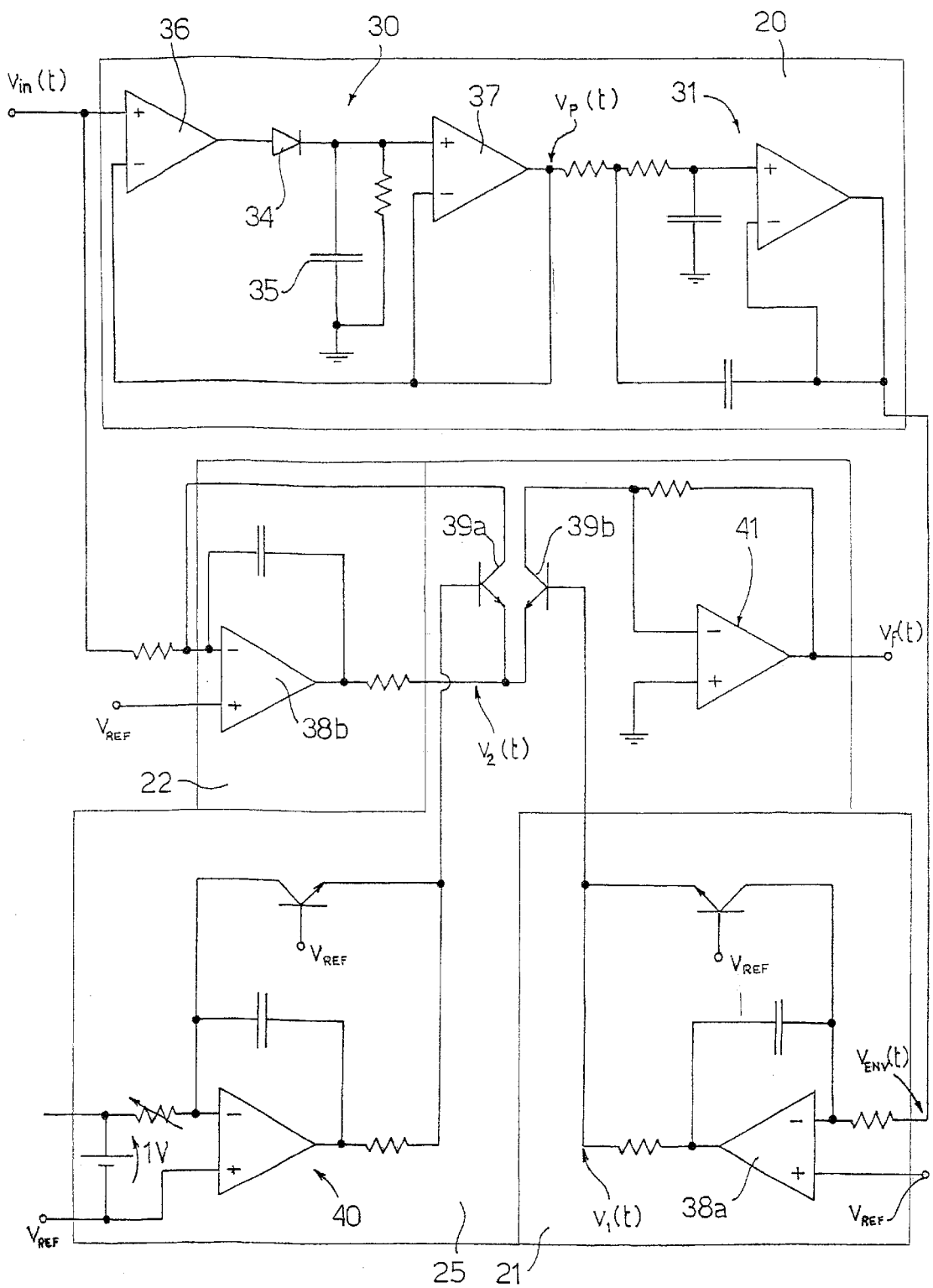
FIG. 4 shows a detailed circuit diagram of the device of FIG. 3.

An embodiment of the illumination compensating device 5, without the normalization-to-one stage 26, is shown in FIG. 4, wherein the envelope-detecting stage 20 comprises a peak-detecting circuit 30 and a low-pass filter 31. In detail, the peak-detecting circuit 30 basically comprises a diode 34 and a capacitor 35, in a per se known manner, and further comprises a first operational amplifier 36 having the aim of eliminating the effect of the voltage drop on the diode 34 and generating a peak voltage $v_P$ which follows exactly the peaks of signal $v_{IN}(t)$, and a second operational amplifier 37 operating as buffer. The low-pass filter 31, which has a standard structure, has the aim of eliminating steps that could create distortions during the division performed by block 25.

Each subtracting node 21 and 22 comprises, in a per se known manner, a respective operational amplifier 38a, 38b in inverting configuration. The divider stage 25 comprises a pair of NPN-type bipolar transistors 39a, 39b, a multiplier-to-one 40, and a current-to-voltage converter 41. In detail, the bipolar transistor 39a has its collector terminal receiving the input signal $v_{IN}(t)$, its base terminal connected to the output of the second subtracting node 22, and its emitter terminal connected to the output of the multiplier-to-one 40.

The bipolar transistor 39b has its collector terminal connected to the input of the current-to-voltage converter 41, its base terminal connected to the output of the first subtracting node 21, and its emitter terminal connected to the emitter terminal of the bipolar transistor 39a. Both the multiplier-to-one 40 and the current-to-voltage converter 41 comprise a respective operational amplifier, appropriately connected, in a per se known manner.

Figure 5A:
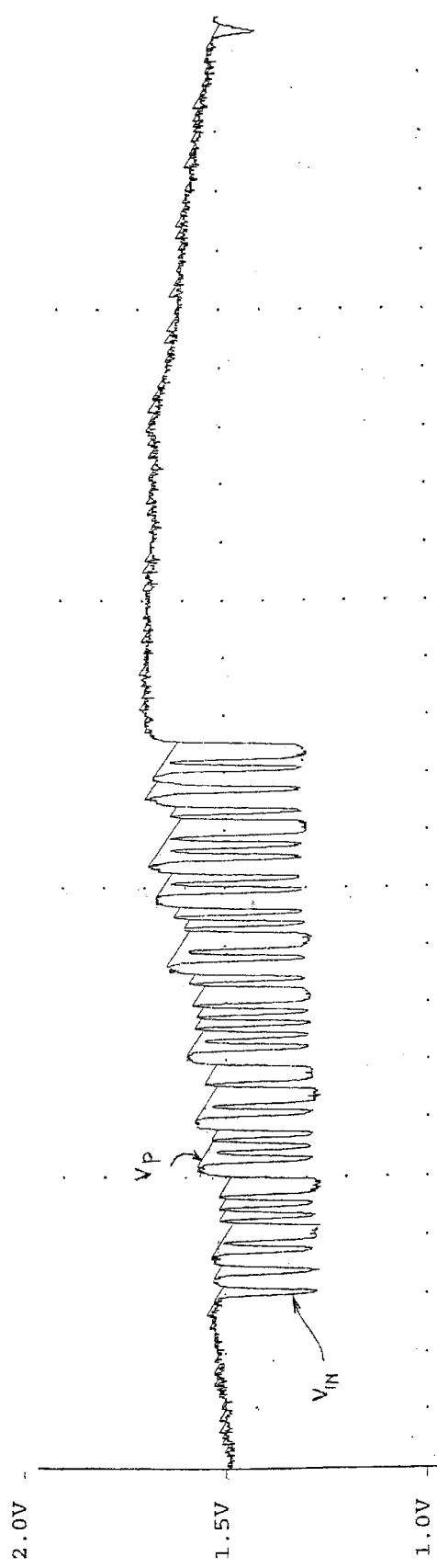
FIGS. 5a, 5b, and 5c show the plots of electrical quantities taken on the diagram of FIG. 3, for a first optical code.
Figure 5B:
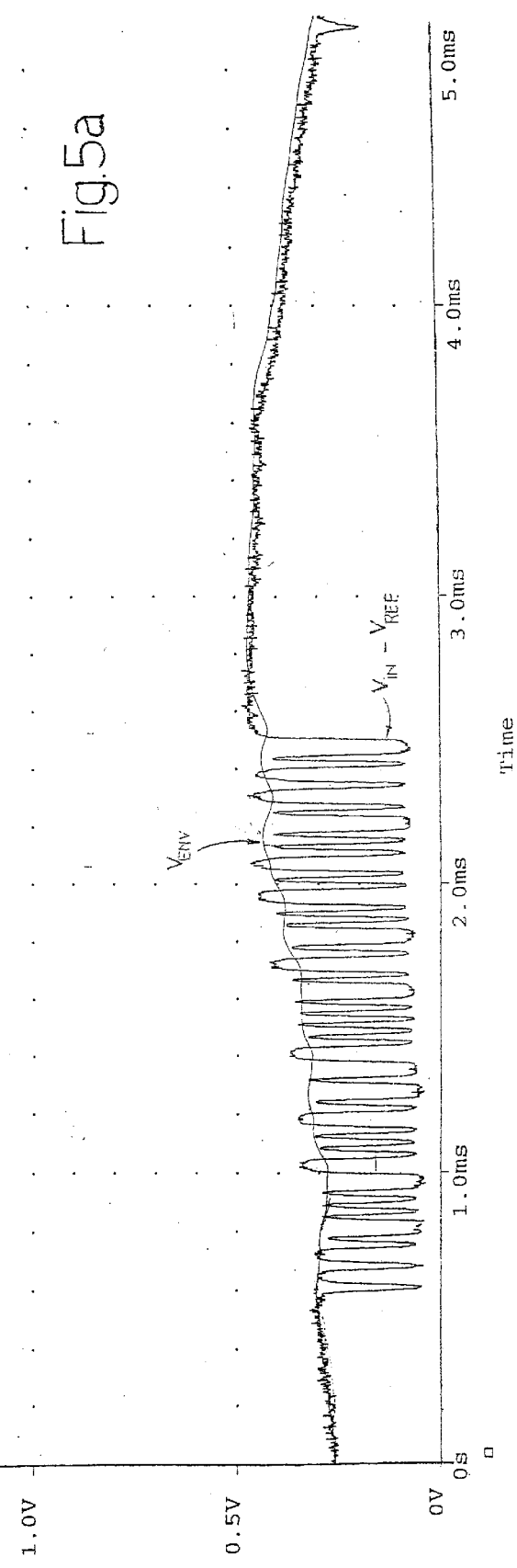
Figure 5C:
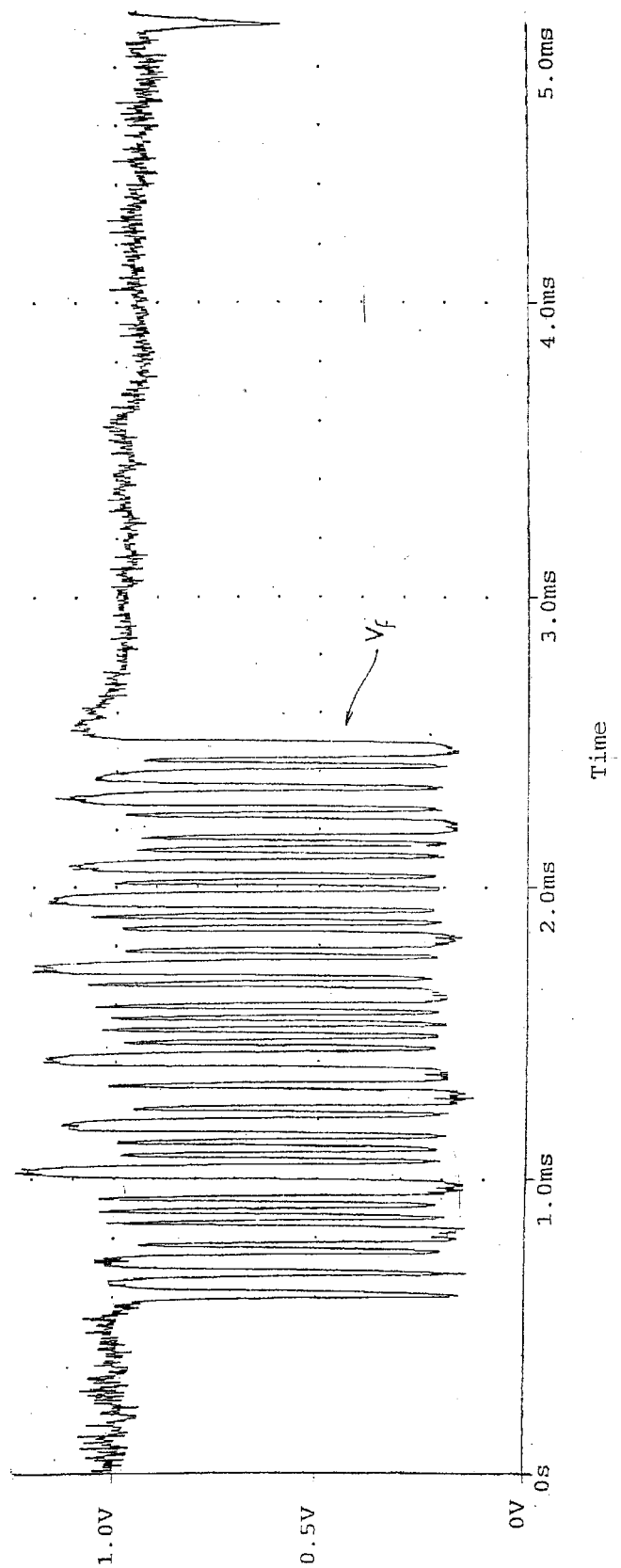
Figure 6A:
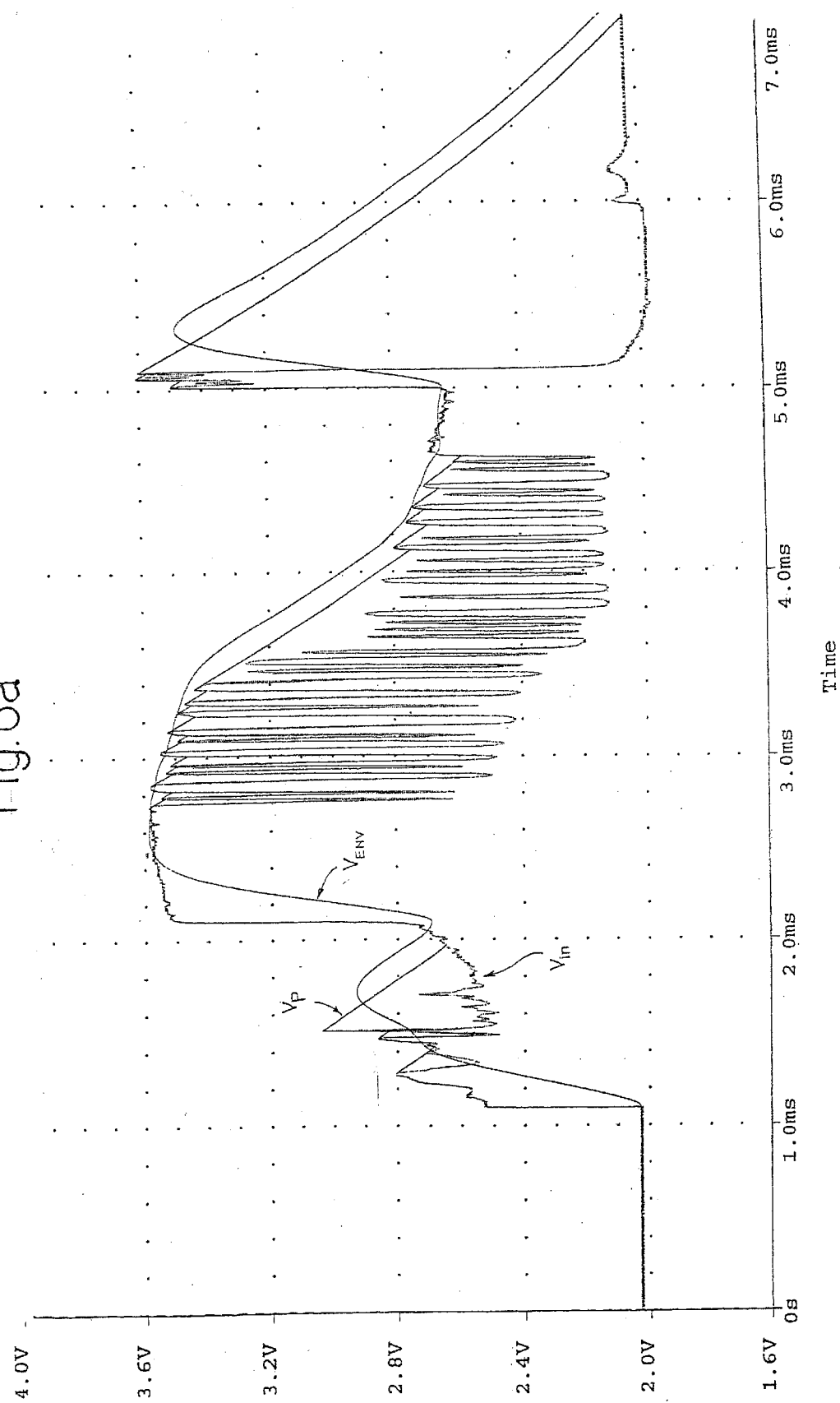
FIGS. 6a and 6b show the plots of electrical quantities taken on the diagram of FIG. 3, for a second optical code.
Figure 6B:
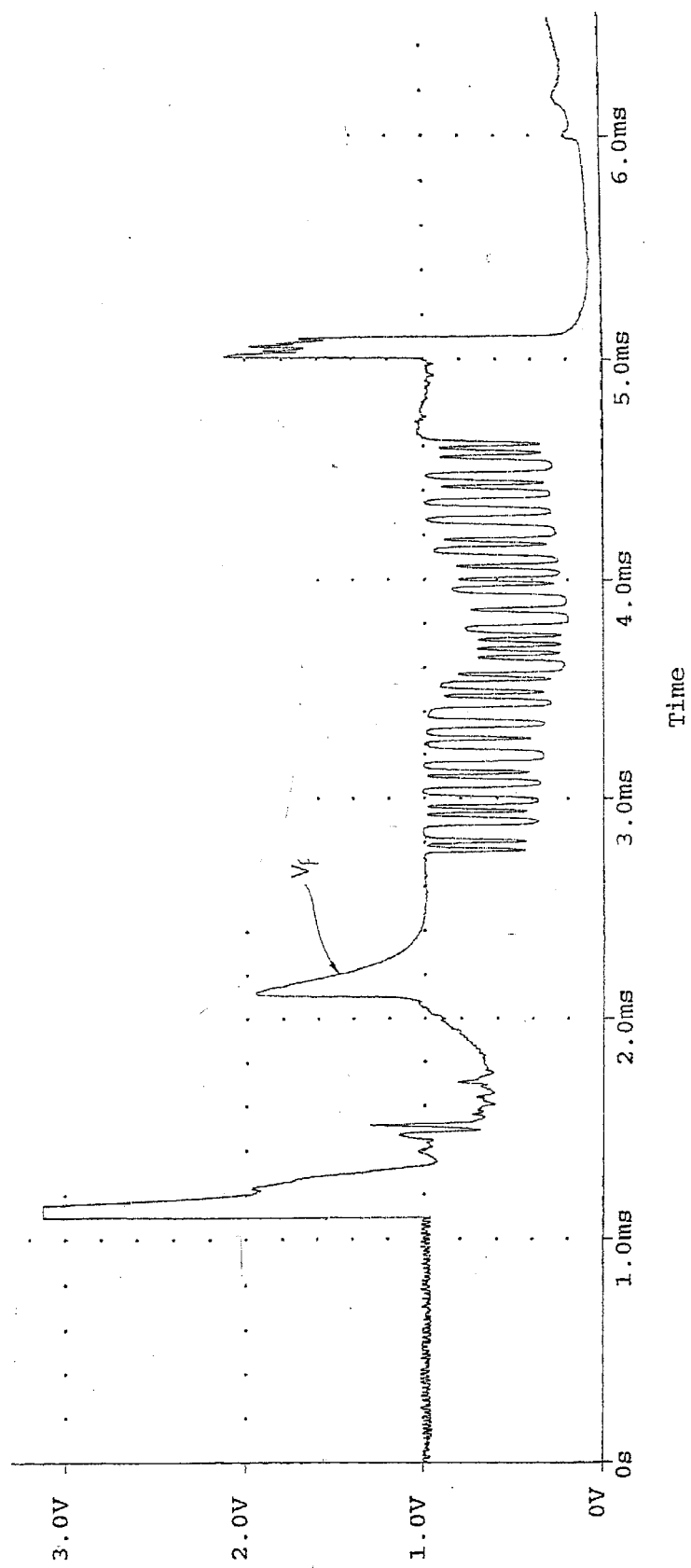

FIGS. 5a–5c and 6a–6b show the plots obtainable with the illumination compensating device 5 of FIG. 4 for two different acquisitions. In particular, FIG. 5a shows the plots of two different input signals $v_{IN}(t)$ and the corresponding peak signals $v_P(t)$ at the output of the peak-detecting circuit 30; FIG. 5b shows the plot of the filtered signal $v_{ENV}(t)$ at the output of the low-pass filter 31; and FIG. 5c shows the plot of the output signal $v_f(t)$ at the output of the divider stage 25. FIGS. 6a and 6b show the plots of similar signals in case of very marked compensation of the luminosity variation.

Figure 7:
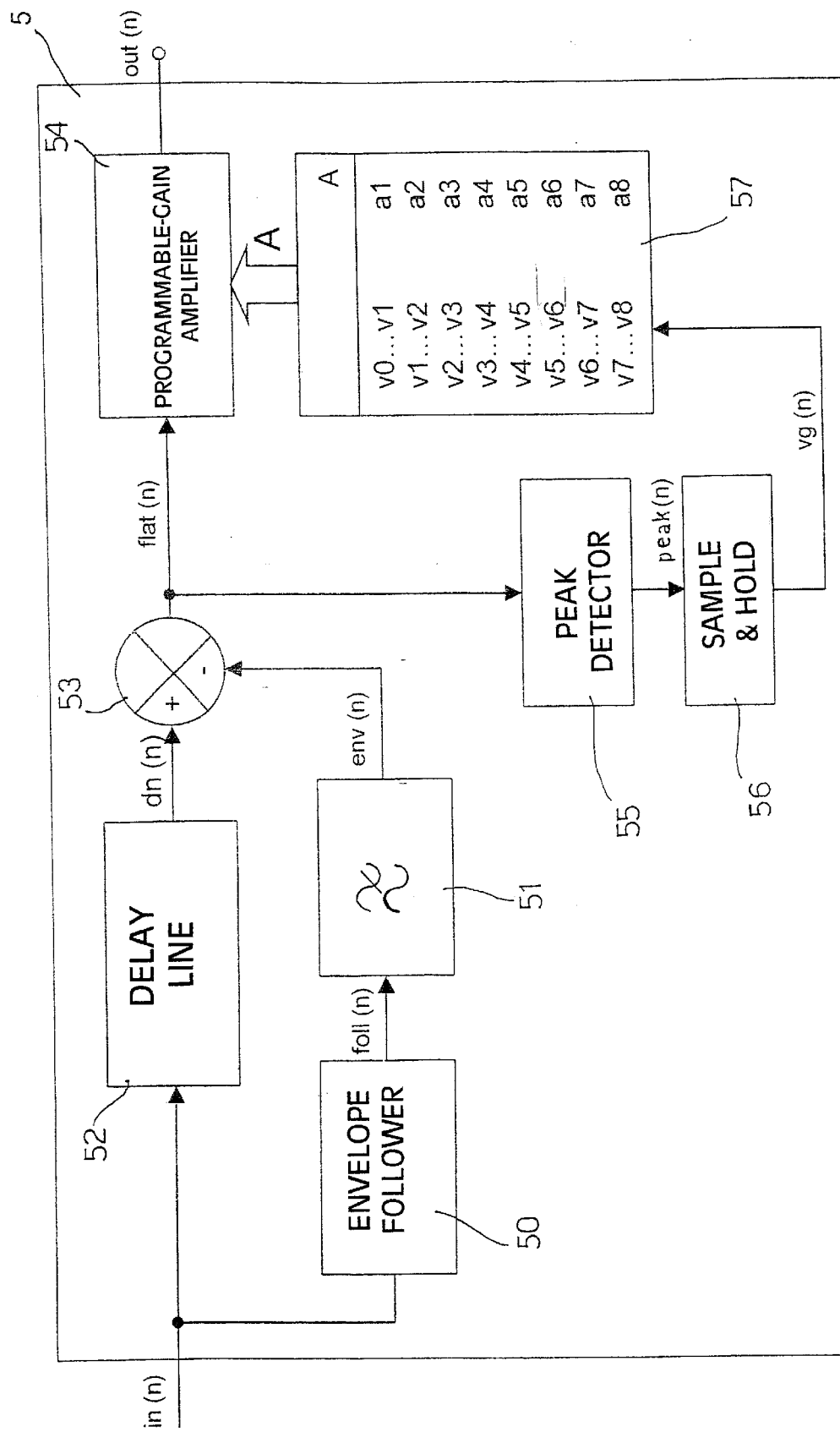
FIG. 7 illustrates a block diagram of a second embodiment of the compensation device according to the invention.
Figure 8A:
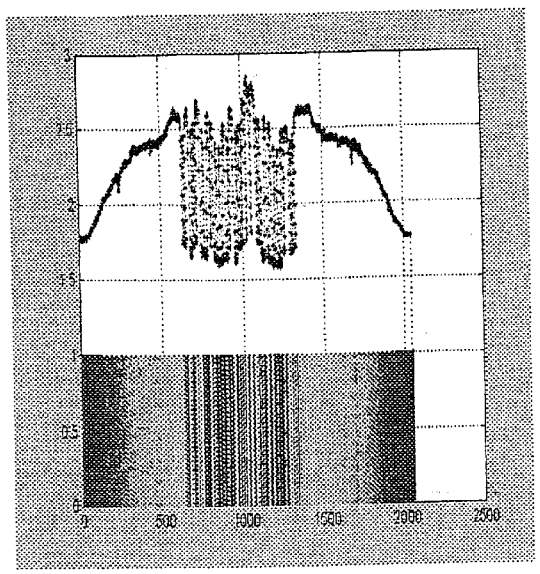
FIGS. 8a, 8b, 8c and 8d show the plots of electrical quantities taken on the diagram of FIG. 7.
Figure 8B:
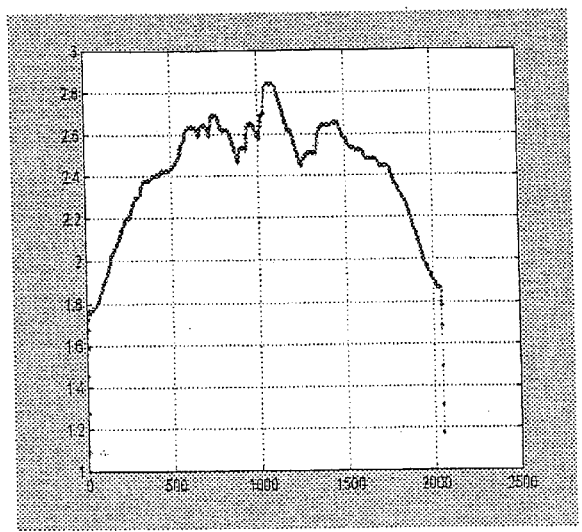
Figure 8C:
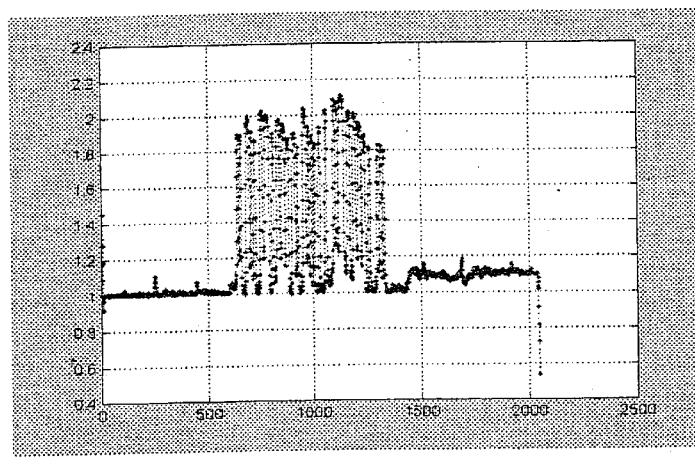
Figure 8D:
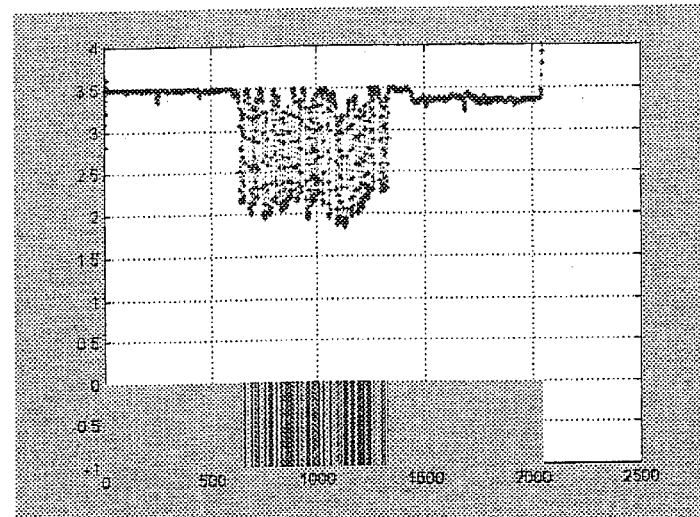

FIG. 7 shows a second embodiment of the illumination compensating device 5, of a type operating in discrete-time mode, which can be advantageously used with a CMOS-type optical sensor and outputs sampled signals, wherein each sample corresponds to a pixel. In this situation, advantageously, the illumination compensating device 5 can be implemented using the switched-capacitor technique.

In particular, in the embodiment of FIG. 7, the comparison between the envelope signal and the input signal is implemented as a subtraction, which can be easily performed with the switched-capacitor technique, and in any case yields a good compensation.

In detail, the illumination compensating device 5 comprises an envelope-follower stage 50 receiving the input signal, here designated by in(n) and supplied in sampled form by the sensor 4 of FIG. 1, and generating at the output an envelope signal foll(n); a low-pass filter 51 arranged downstream of the envelope-follower stage 50 and generating a filtered signal env(n); a digital delay line 52 receiving the input signal in(n) and outputting the delayed input signal d(n); a subtracting node 53 connected to the output of the low-pass filter 51 and to the output of the digital delay line 52 and outputting a normalized signal flat(n); a programmable-gain amplifier 54 having a signal input receiving the normalized signal flat(n) and a control input receiving a gain-control signal A and supplying at the output the compensated output signal out(n); a peak-detecting stage 55 receiving at the input the normalized signal flat(n) and supplying at the output a peak signal peak(n); a sample-and-hold stage 56 connected downstream of the peak-detecting stage 55 and generating a gain-selection signal vg(n); and a stored table 57 receiving the gain-selection signal vg(n) and generating the gain-control signal A.

The envelope-follower stage 50 calculates the envelope signal foll(n) by carrying out the following operations:

foll(n)=min(pks1(n)+K1, max(foll(n−1), pks1(n)))

where pks1(n)=max(pks1(n−1)−K2, in(n)), pks1(0)=in(0), and

K1, K2 are two appropriate constants.

The low-pass filter 51 is of a linear-phase, second-order type. Like the circuit 31 of FIG. 4, this filter has the aim of eliminating the edges (i.e., rapid variations) present in the envelope signal foll(n), which would introduce distortions in performing the normalization (subtraction) operation.

The digital delay line 52 has the aim of compensating the delay introduced by the low-pass filter 51 on the envelope signal foll(n). The delayed signal d(n) is thus equal to the input signal in(n), but temporally aligned with the envelope signal foll(n). Thereby, it is possible to limit distortion in performing normalization.

The programmable-gain amplifier 54, together with the peak-detecting stage 55, the sample-and-hold stage 56, and the stored table 57 form an amplification system supplying an output signal out(n) having a preset amplitude, as required by the subsequent signal-processing blocks. In particular, for execution simplicity, the gain value A is not variable in a continuous way but is selected among n suitable values.

Specifically, the amplification values $A_n$ have a geometrical progression of the type:

$$A_n = A_{n-1}x = A_{n-2}x^2 = \ldots = A_0 x^n$$

wherein $$x = \sqrt[n]{\frac{A_n}{A_0}}$$

Thereby, the ratio between each level of amplification and the subsequent one is constant.

Assuming that the reader operates in a continuous way, i.e., processing the scans acquired on the optical code in sequence, the amplification value is set at each scan on the basis of the information obtained from the previous scan.

In particular, on the basis of the peak value $v_P$ of the nth scan, detected by the peak-detecting stage 55, the amplification value $A_n$ is selected corresponding to the interval $v_i-v_{i+1}$ containing the gain-selection signal vg(n) corresponding to the detected peak value peak(n).

This solution enables normalization "to 1" of the signal, where the value "1" indicates a preset amplitude of the signal. In practice, the peak detector 55 determines the distance of the darkest pixel from the black level and amplification is chosen in such a way that the darkest pixel has zero amplitude, and the lightest pixel has the normalized amplitude 1. In this way, the widest possible dynamics is achieved for the compensated signal out(n).

FIGS. 8a, 8b, 8c, and 8d show an example of a detected optical code, and the corresponding plots of the input signal in(n), envelope signal env(n), normalized signal flat(n), and final compensated signal out(n).

The advantages of the described method and device are evident from the above. In particular, it is emphasized that they enable ample compensation of the variations in the electrical signal (with the exception of those due to the coded optical information), irrespective of the cause of such variations (illumination system, optical group, environmental conditions, code type, etc.). In particular, they are not influenced by the capacity of any given illumination system for producing uniform illumination on the code, and enable saving of illumination energy by the illumination system, thanks to an appropriate amplification of the detected signal.

With the embodiment of FIG. 7 it is moreover possible to integrate, in a same CMOS device, the sensor 4, the illumination compensating device 5 and the downstream processing devices, such as the digitization circuit, circuits interfacing with other electronic devices used in optical-code reading apparatus, or devices that communicate with the optical code readers themselves.

Finally, it is clear that numerous modifications and variations may be made to the method and device described and illustrated herein, all falling within the scope of the invention, as defined in the attached claims. In particular, it is stressed that final normalization "to 1", albeit advantageous, is not indispensable. In addition, the described method can be used not only for linear sensors, but also for two-dimensional (2D) sensors. In particular, for this purpose, it is possible to analyze the two-dimensional image row by row, repeating the processing described for each row and reconstructing the image with the "normalized" rows.

Alternatively, it is possible to normalize one line every n lines, and then derive by interpolation the values useful for normalizing the intermediate rows.

What is claimed is:

1. A method for compensating undesired variations in an electrical signal generated by a sensor of an optical code reader, comprising:
   generating an envelope signal starting from said electrical signal;
   normalizing said electrical signal with respect to said envelope signal to obtain a normalized signal; and
   amplifying said normalized signal in a controlled way to supply an output signal of preset amplitude.

2. The method according to claim 1, further comprising the step of filtering said envelope signal with a low-pass filter before said step of normalizing.

3. The method according to claim 1, wherein said step of normalizing comprises the step of dividing said electrical signal by said envelope signal.

4. The method according to claim 1, wherein electrical signal, said envelope signal, and said normalized signal are continuous-time signals.

5. The method according to claim 3, wherein said step of normalizing comprises the step of summing a reference value to said envelope value and said electrical signal.

6. The method according to claim 1, wherein said step of normalizing comprises the step of subtracting said envelope signal from said electrical signal.

7. The method according to claim 1, wherein said electrical signal, said envelope signal, and said normalized signal are discrete-time signals.

8. The method according to claim 6, further comprising the step of delaying said electrical signal before subtracting said envelope signal from said electrical signal.

9. A method for compensating undesired variations in an electrical signal generated by a sensor of an optical code reader, comprising the steps of generating an envelope signal starting from said electrical signal, normalizing said electrical signal with respect to said envelope signal to obtain a normalized signal, and amplifying said normalized signal in a controlled way to supply an output signal of preset amplitude, wherein said step of amplifying in a controlled way comprises the steps of: detecting a peak value of said normalized signal; selecting a gain-control signal as a function of said peak value; and multiplying said normalized signal by said gain-control signal.

10. A device for compensating undesired variations in an electrical signal generated by a sensor of an optical code reader, said device having an input terminal receiving said electrical signal, the device comprising an envelope-generating stage receiving said electrical signal and generating an envelope signal, a normalization stage normalizing said electrical signal according to said envelope signal and outputting a normalized signal, and an amplification stage for amplifying said normalized signal in a controlled way to supply an output signal of preset amplitude.

11. The device according to claim 10, further comprising a low-pass filter arranged downstream of said envelope-generating stage.

12. The device according to claim 10, further comprising a controlled-gain amplifier means for receiving said normalized signal and generating an output signal ranging between a first preset and a second preset amplitude value.

13. The device according to claim 10, wherein said envelope-generating stage and said normalization stage are continuous-time circuits.

14. The device according to claim 10, wherein said envelope-generating stage comprises a peak-detecting circuit and said normalization stage comprises an analog divider circuit.

15. The device according to claim 13, further comprising a first subtracting node for subtracting a reference value from said electrical signal, and a second subtracting node for subtracting said reference value from said envelope signal.

16. The device according to claim 10, wherein said envelope-generating stage and said normalization stages are circuits operating in discrete-time mode.

17. The device according to claim 10, wherein said normalization stage comprises a subtracting node for subtracting said envelope signal from said electrical signal.

18. The device according to claim 17, further comprising a delay line arranged between said input terminal and said subtracting node.

19. A device for compensating undesired variations in an electrical signal generated by a sensor of an optical code reader, said device having an input terminal receiving said electrical signal, the device comprising an envelope-generating stage receiving said electrical signal and generating an envelope signal, a normalization stage normalizing said electrical signal according to said envelope signal and outputting a normalized signal and a programmable-gain amplifier means connected to an output of said normalization stage and having a control input receiving an amplification control signal; peak-detecting means receiving said normalized signal and outputting a peak-amplitude value of said normalized signal; and selecting means generating said amplification control signal as a function of said peak-amplitude value.

20. The device according to claim 19, wherein said peak-detecting means comprise a peak detector and a memory element, that are cascade-connected; and said selecting means comprise memory-correlation means storing different values of said amplification-control signal as a function of intervals of said peak-amplitude value of said normalized signal.

21. An optical code reader comprising:
   a sensor having an output supplying an electrical signal representative of the luminosity detected by the sensor;
   a device for compensating undesired variations of said electrical signal by generating an envelope signal starting from said electrical signal and normalizing said electrical signal with respect to said envelope signal to obtain a normalized signal, said device being connected to said output of said sensor; and
   an amplifier connected to said device, said amplifier for amplifying said normalized signal in a controlled way to supply an output signal of preset amplitude.

* * * * *

UNITED STATES PATENT AND TRADEMARK OFFICE
CERTIFICATE OF CORRECTION

PATENT NO. : 6,871,785 B2
DATED : March 29, 2005
INVENTOR(S) : Marco Piva and Maurizio Bianchi It is certified that error appears in the above-identified patent and that said Letters Patent is hereby corrected as shown below:

Column 7,
Line 1, insert -- said -- between "wherein" and "electrical".
Line 5, insert -- further -- after "normalizing".

Signed and Sealed this

Twenty-eighth Day of June, 2005

JON W. DUDAS
*Director of the United States Patent and Trademark Office*